United States Patent [19]

St. Amand et al.

[11] Patent Number: 4,653,690

[45] Date of Patent: Mar. 31, 1987

[54] METHOD OF PRODUCING CUMULUS CLOUDS

[75] Inventors: Pierre St. Amand; Larry A. Mathews, both of Ridgecrest, Calif.

[73] Assignee: The United States of America as represented by the Secretary of the Navy, Washington, D.C.

[21] Appl. No.: 668,050

[22] Filed: Nov. 5, 1984

[51] Int. Cl.[4] ............................................. A01G 15/00
[52] U.S. Cl. ...................................... 239/2.1; 149/87; 149/117
[58] Field of Search ............... 239/2 R, 14; 252/305; 149/117, 87, 19.9, 19.6, 19.1

[56] References Cited

U.S. PATENT DOCUMENTS

| Re. 29,142 | 2/1977 | Papee et al. | 252/305 |
|---|---|---|---|
| 2,665,168 | 1/1954 | Kerlin | 299/28 |
| 2,934,275 | 4/1960 | Ball | 239/2 |
| 3,625,855 | 12/1971 | Douda | 252/305 |
| 3,630,950 | 12/1971 | Papee et al. | 252/305 |
| 3,784,099 | 1/1974 | Bosco | 239/2 R |
| 3,983,816 | 10/1976 | Cornia et al. | 149/87 |
| 4,096,005 | 6/1978 | Slusher | 149/19.6 |
| 4,269,637 | 5/1981 | Flanagan | 149/19.6 |
| 4,379,903 | 4/1983 | Reed, Jr. et al. | 149/19.6 |
| 4,405,762 | 9/1983 | Earl et al. | 149/122 |
| 4,483,978 | 11/1984 | Manser | 149/88 |

FOREIGN PATENT DOCUMENTS 1536416  4/1902  France ........................ 149/117

*Primary Examiner*—Andres Kashnikow
*Assistant Examiner*—Mary Beth O. Jones
*Attorney, Agent, or Firm*—William C. Townsand; W. Thom Skeer

[57] ABSTRACT

The disruption of a thermal inversion and formation of cumulus clouds is produced by the ignition of a pyrotechnic composition containing an alkali earth metal. The combined heats of hydration, condensation and combustion of the composition disrupt the thermal layer allowing the passage of warm moist air into a zone of cooler air. The formation of cumulonimbus or cumulus clouds results.

6 Claims, No Drawings

METHOD OF PRODUCING CUMULUS CLOUDS

BACKGROUND OF THE INVENTION

1. Field of the Invention

This invention relates to pyrotechnic compositions capable of generating aerosols. More particularly, this invention relates to combustible compositions comprising an alkali earth metal and a halide supplying compound. Finally, this invention relates to the disruption of a thermal inversion by combining the heats of hydration, condensation and combustion resulting from the ignition of a pyrotechnic composition which produces an alkali earth halide aerosol having a high heat of hydration.

2. Description of the Prior Art

Various methods have been employed in the past in an attempt to control or modify weather conditions so as to produce rainfall. One atmospheric condition often associated with diminished rainfall is atmospheric layering or thermal inversion. A thermal inversion may be defined as a reversal in the normal temperature lapse rate, in which the temperature rises with increased elevation, instead of falling.

To assist nature in the disruption of thermal inversion layers, means for producing an artificial impulse or updraft of heated air have included the burning of oil or changing the albedo of the earth's surface such as by darkening the ground. Also, the utilization of various chemicals sprayed into the atmosphere or inducing precipitation by utilizing ultrasonic energy have been proposed.

However, none of these methods have proven successful in penetrating an inversion layer allowing moist air to pass through and into the cooler air mass above the inversion thereby enhancing rain-producing cloud formation.

SUMMARY OF THE INVENTION

A highly effective method of producing cumulonimbus or cumulus clouds in a geographical location dominated by a thermal inversion can be realized by the ignition of a pyrotechnic composition which induces a thermal updraft. This updraft combines and utilizes the heats of combustion, condensation and hydration to penetrate a thermal inversion and form a passageway or conduit therethrough. This allows the passage of warmer moist air from below into the cooler air above effectively lowering the inversion layer and promoting cloud formation.

OBJECTS OF THE INVENTION

It is an object of this invention to provide a simple and effective method for the disruption of a thermal inversion.

Another object of the invention is the formation of cumulus or cumulonimbus clouds in the vicinity of a thermal inversion.

Yet another object of this invention is to provide a pyrotechnic composition which upon ignition combines the heats of hydration, combustion and condensation to produce a pocket or rising warm air capable of penetrating an inversion layer.

These and other objects of the invention will become more readily apparent from the following specification.

DETAILED DESCRIPTION OF THE INVENTION

A method of penetrating a thermal inversion and producing atmospheric conditions conducive to cloud formation comprises igniting a pyrotechnic composition containing an alkali earth metal such as magnesium, and at least one halogen containing compound which reacts with the alkali metal to produce magnesium chloride. Magnesium chloride is deliquescent at a relative humidity of about 30 percent. Additionally, each mole of $MgCl_2$ takes up to six moles of water of hydration and releases 101.4 kcal heat of hydration. This occurs when the $MgCl_2$ aerosol combines with water in the atmosphere to form biscofite ($MgCl_2.6H_2O$). In addition to the heat of hydration, heat of condensation is released. The formulation or pyrotechnic composition may be ignited at ground level or near the inversion layer by means known in the art. When ignition occurs the heat of combustion will produce a $MgCl_2$ aerosol which rises into the atmosphere. As this aerosol encounters a relative humidity of greater than 30 percent, water is taken up as hydrated water and releases heat of hydration. As this occurs, the resulting biscofite powder deliquesces into solution droplets which evolve heat of condensation as water is taken up. During the turn phase of the composition, the heat of combustion will dissipate. However, the heat of hydration will sustain the generation of heat forcing the products of combustion to rise and penetrate the inversion layer. This allows the warmer moist air to flow into the region of cooler air to form rain-producing clouds.

Ordinarily, a condensation or freezing nuclei is required to cause super cooled water to freeze giving up heats of fusion and condensation to produce rain as the frozen droplets fall through the atmosphere into warmer atmospheric conditions.

This phenomena will not occur in cloud formations warmer than the nuclei activation temperature which is always less than 0° C. The method and compositions of the present invention will cause the release of heat of hydration with resulting condensation in the atmosphere at temperatures both above and below 0° C. thereby inducing cloud formation under temperature conditions independent of condensation nuclei or ice nuclei activation temperature.

The magnesium chloride aerosols can be generated by the compositions shown in Table 1, wherein all compositions are in weight percent.

TABLE 1

| COMPOUND | FORMULATION | | | | |
|---|---|---|---|---|---|
| | I | II | III | IV | V |
| Hydroxyl-terminated Polybutadiene | | 26.3 | 8.6 | 23.2 | |
| GAP | | | | | 22.9 |
| Biuret trimer of hexamethylenediisocyanate | | 2.4 | 1.4 | 3.8 | 4.1 |
| Magnesium | 24 | 14.8 | 19.0 | 15.0 | 15.0 |
| Dechlorane | | 56.5 | 51.0 | | |
| Hexachloro-1,3-Butadiene | | | 20.3 | | |
| Hexachlorobenzene | | | | 58.0 | 58.0 |
| Hexachloroethane | 76 | | | | |

The chlorinated compounds supply chlorine to the reaction which combines with the magnesium to produce magnesium chloride upon combustion. These chlorinated compounds include chlorinated aromatic hydrocarbons, chlorinated cyclo aliphatic hydrocarbons and chlorinated aliphatic hydrocarbons. The hydroxyl-terminated polybutadiene is used in certain of the compositions as an organic fuel and binder because of its general inertness, handling and mixing safety, and low cost.

Suitable energetic binders which may be used in the pyrotechnic composition include glycidyl azide polymer (GAP), copolymer of bis(azidomethyl)oxetane and azidomethylmethyloxetane (BAMO/AMMO), polynitromethylmethyloxetane (NMMO) and a copolymer of bis(azidomethyl)oxetane and bis(nitratomethyl)oxetane (BAMO/BNMO).

An advantage of these pyrotechnic compositions is their ability to produce copious numbers of hygroscopic aerosol which, when exposed to a sufficient level of ambient humidity of from about 30 percent relative humidity, deliquesce to form solution droplets of approximately twice their original size and eight times their original mass. In turn, the overall mass yield factor is increased. This yield factor is the mass of the aerosol particles and of the water accreted thereupon per gram of composition. At a relative humidity greater than about 30 percent, a majority of the particle mass exists at a particle diameter between about 5 and about 10 microns. The heat transfer from these particles is prolonged as is the heat emission for the aerosol produced by these pyrotechnic compositions.

In order that those skilled in the art may better understand how the present invention may be practiced, the following examples are given by way of illustration and not by way of limitation. All parts are given in weight percent unless otherwise indicated.

EXAMPLE 1

A pyrotechnic composition is prepared by blending 24 percent by weight magnesium powder with 76 percent by weight hexachloroethane. Upon combustion, this composition by stoichiometric balance will give a 94 percent yield of magnesium chloride. The theoretical total heat of hydration provided by the magnesium chloride will be 100.2 kcal/100 gm formulation.

EXAMPLE 2

A pyrotechnic composition of 26.3 percent hydroxyl-terminated polybutadiene, 2.4 percent biuret trimer of hexamethylenediisocyanate, 14.8 percent magnesium powder and 56.5 percent by weight Dechlorane was blended and cured for one hour at 130° F. Dechlorane is a registered trademark of the Hooker Chemical Company for a chlorinated cyclo aliphatic (empirical formula-$C_{18}H_{12}Cl_{12}$) having the following structure:

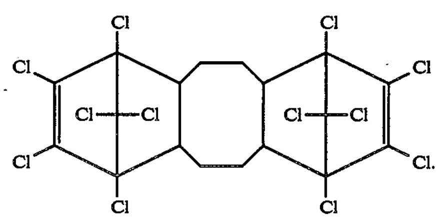

Stoichiometrically this composition yielded 49.4 percent magnesium chloride and a heat of hydration of 52.60 kcal/100 gm of formulation.

EXAMPLE 3

A composition was prepared by blending 8.6 percent hydroxyl-terminated polybutadiene, 1.4 percent biuret trimer of hexamethylenediisocyanate as a curative, 19 percent magnesium powder, 51 percent Dechlorane and 20 percent hexachloro-1,3-butadiene. The resulting mixture was cured for one hour at 130° F. This composition will yield 66.5 percent magnesium chloride and a heat of hydration of 70.80 kcal/100 gm of formulation.

The pyrotechnic compositions of Examples 2 and 3 generate smokes composed of $MgCl_2$ and carbon aerosol. The carbon component of these smokes results from the combustion of Dechlorane which produces carbon aerosol and chlorine radicals. The chlorine then combines with magnesium, forming the hygroscopic $MgCl_2$ aerosol.

EXAMPLE 4

A composition of 23.2 percent hydroxyl-terminated polybutadiene, 3.8 percent biuret trimer of hexamethylenediisocyanate, 15 percent magnesium powder and 58 percent hexachlorobenzene is mixed and cured at 130° F. for one hour. Upon combustion, this composition will yield 58.2 percent magnesium chloride having a heat of hydration of 62.0 kcal/100 gm of formulation.

EXAMPLE 5

A composition is prepared by mixing 22.9 percent of a glycidyl-azide polymer (GAP-energetic prepolymer) having the formula 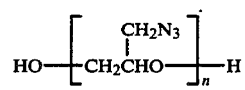 wherein n is an integer from about 10 to about 55 inclusive, 4.1 percent biuret trimer of hexamethylenediisocyanate, 15 percent magnesium powder and 58 percent hexachlorobenzene. This mixture is cured for one hour at 130° F. When ignited, there will be produced 58.2 percent magnesium chloride having a heat of hydration of 62.0 kcal/100 gm of formulation.

The method of forming an aerosol to accomplish the objectives set forth herein can be accomplished by mixing a formulation or composition as described in this specification, curing where appropriate at from 100° F. to 180° F., and burning the formulation in an environment having a relative humidity greater than 30 percent and at temperatures above and below 0° C.

Obviously, many modifications and variations of the present invention are possible. It should be understood that, within the scope of the appended claims, the invention may be practiced otherwise than as specifically described.

What is claimed is:

1. A method for the disruption of a thermal inversion layer in the atmosphere at temperatures above and below 0° C. whereby cumulus cloud formation is enhanced comprising the steps of:

mixing a pyrotechnic composition containing from about 15 percent to about 25 percent by weight magnesium, and from about 56 percent to about 76 percent by weight of at least one chlorine supplying compound;

burning said composition to produce combustion products in an environment having a relative humidity greater than about 30 percent;

producing and augmenting a thermal updraft through the initial heat of combustion resulting from combustion of said composition;

maintaining said thermal updraft by the heat of hydration from an alkali earth metal aerosol formed as one of the products of the reaction of said magnesium and said chlorine supplying compound during combustion, and the heat of condensation resulting from the deposition of water on aerosol nuclei formed from said combustion by-products; and penetration and disruption of said inversion layer by said aerosol and said products resulting in a lowering of and conduit formation through said thermal inversion for the passage of air beneath said inversion therethrough.

2. A method for the disruption of a thermal inversion according to claim 1 wherein said chlorine supplying compound is selected from the group consisting of hexachlorobenzene, hexachlorobutadiene, hexachloroethane and Dechlorane.

3. A method for the disruption of a thermal inversion according to claim 1 wherein said composition further includes hydroxylterminated polybutadiene as a binder.

4. A method for the disruption of a thermal inversion according to claim 1 wherein said formulation further includes a biuret trimer of hexamethylenediisocyanate as a curative.

5. A method for the disruption of a thermal inversion according to claim 1 wherein said formulation also includes a glycidylazide polymer having the formula $$HO-\left[CH_2CHO\underset{|}{\overset{CH_2N_3}{}}\right]_n-H.$$

6. A method for the disruption of a thermal inversion according to claim 1 wherein said formulation includes a polymer selected from the group consisting of a copolymer of bis(azidomethyl)oxetane and azidomethylmethyloxetane, poly-nitromethylmethyloxetane and a copolymer of bis(azidomethyl)oxetane and bis(nitratomethyl)oxetane.

* * * * *